(12) United States Patent
Yang (10) Patent No.: US 9,906,950 B2
(45) Date of Patent: Feb. 27, 2018

(54) METHOD AND DEVICE FOR SECURITY ISOLATION (75) Inventor: Yi Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 13/979,219

(22) PCT Filed: Jan. 4, 2012

(86) PCT No.: PCT/CN2012/070028
§ 371 (c)(1),
(2), (4) Date: Jul. 11, 2013

(87) PCT Pub. No.: WO2012/094958
PCT Pub. Date: Jul. 19, 2012

(65) Prior Publication Data
US 2013/0288642 A1    Oct. 31, 2013

(30) Foreign Application Priority Data
Jan. 11, 2011 (CN) .......................... 2011 1 0004665

(51) Int. Cl.
*H04W 12/02* (2009.01)
*H04W 36/00* (2009.01)
(Continued)

(52) U.S. Cl.
CPC ............ *H04W 12/02* (2013.01); *H04W 12/04* (2013.01); *H04W 36/0038* (2013.01); *H04W 84/047* (2013.01)

(58) Field of Classification Search
CPC ... H04W 36/32; H04W 74/006; H04W 36/38; H04W 64/003; H04W 48/08; H04W 8/04;
(Continued)

(56) References Cited

U.S. PATENT DOCUMENTS

| 8,238,916 B2 | 8/2012 | Iwamura et al. | |
| 2011/0086640 A1* | 4/2011 | Iwamura | H04L 63/06 455/436 |
| 2012/0276910 A1* | 11/2012 | Zhang | H04W 36/0005 455/439 |

FOREIGN PATENT DOCUMENTS

| CN | 101772100 A | 7/2010 |
| CN | 101827428 A | 9/2010 |

(Continued)

OTHER PUBLICATIONS

International Search Report of PCT/CN2012/070028, Apr. 5, 2012.
International Preliminary Report on Patentability of PCT/CN2012/070028, Jul. 16, 2013.

*Primary Examiner* — Phuoc H Doan
(74) *Attorney, Agent, or Firm* — Oliff PLC (57) ABSTRACT

Disclosed are a method and device for security isolation. The method comprises: when a relay device receives a handover request message, if the handover request message contains reestablishment information for another cell, then when a user equipment is successfully handed over to a cell of the relay device or is successfully reestablished in the cell of the relay device, the relay device requesting a piece of key information from core network equipment. In embodiments of the present invention, the probability of successful reestablishment during UE handover is increased, and the probability of handover failure is reduced, also, as the key is isolated, communication security of the user is ensured.

8 Claims, 6 Drawing Sheets

(51) Int. Cl.
*H04W 12/04* (2009.01)
*H04W 84/04* (2009.01)

(58) Field of Classification Search
CPC . H04W 36/0022; H04W 76/06; H04W 88/02;
H04L 61/2007
USPC .................. 455/410, 436, 439; 370/315, 331
See application file for complete search history.

(56) References Cited

FOREIGN PATENT DOCUMENTS

| | | | |
|---|---|---|---|
| CN | 102065424 A | 5/2011 | |
| WO | WO 2009/157549 A1 | 12/2009 | |

\* cited by examiner

METHOD AND DEVICE FOR SECURITY ISOLATION

CROSS REFERENCE TO RELATED APPLICATIONS

This application is the National Stage of PCT/CN2012/070028 filed on Jan. 4, 2012, which claims priority under 35 U.S.C. § 119 of Chinese Application No. CN 201110004665.6 filed on 11 Jan. 2011, the disclosures of which are incorporated by reference. The international application under PCT article 21(2) was not published in English.

FIELD OF THE PRESENT INVENTION

The present invention relates to the field of communication technology, in particular to the method and device for security isolation.

BACKGROUND OF THE PRESENT INVENTION

In mobile communication system in future, such as B3G (Beyond Third Generation) or LTE-A (Long Term Evolution-Advanced), higher peak data rate and cell throughput capacity will be provided, and greater bandwidth will be required at mean time. At present, available bandwidth less than 2 GHz is rare and part of or all bandwidths required in B3G/LTE-A system can only be found on higher frequency range (such as above 3 GHz). The higher the frequency range is, the faster radio wave propagation attenuation will be, the shorter the transmission distance will be and the more eNB will be required for continuous coverage within a certain area. eNBs require high cost, so it will increase the total deployment cost. To reduce the deployment cost and solve the coverage issue, RN (Relay Node) can be introduced to the system.

Figure 1:
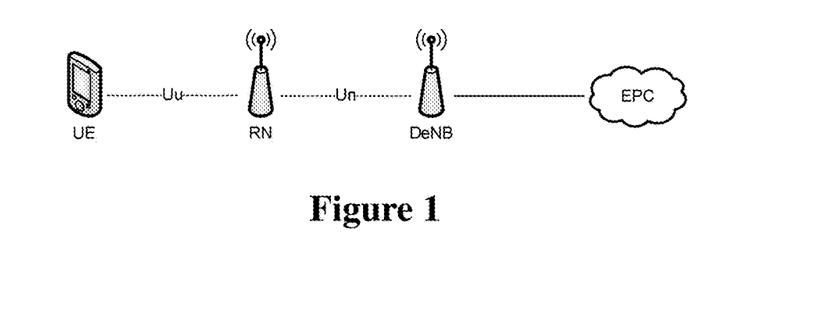
FIG. 1 is a network structural diagram of LTE-A system after introducing RN in the prior art.

FIG. 1 shows the network structure of a LTE-A system introduced with the RN. The RN is wireless connected to a core network through a donor cell under a DeNB (Donor Evolved Node B) other than a direct wired link between the RN and the core network; each RN can control a or several cells; interface between a UE and the RN is called Uu, and that between the RN and the DeNB is called Un.

Figure 2:
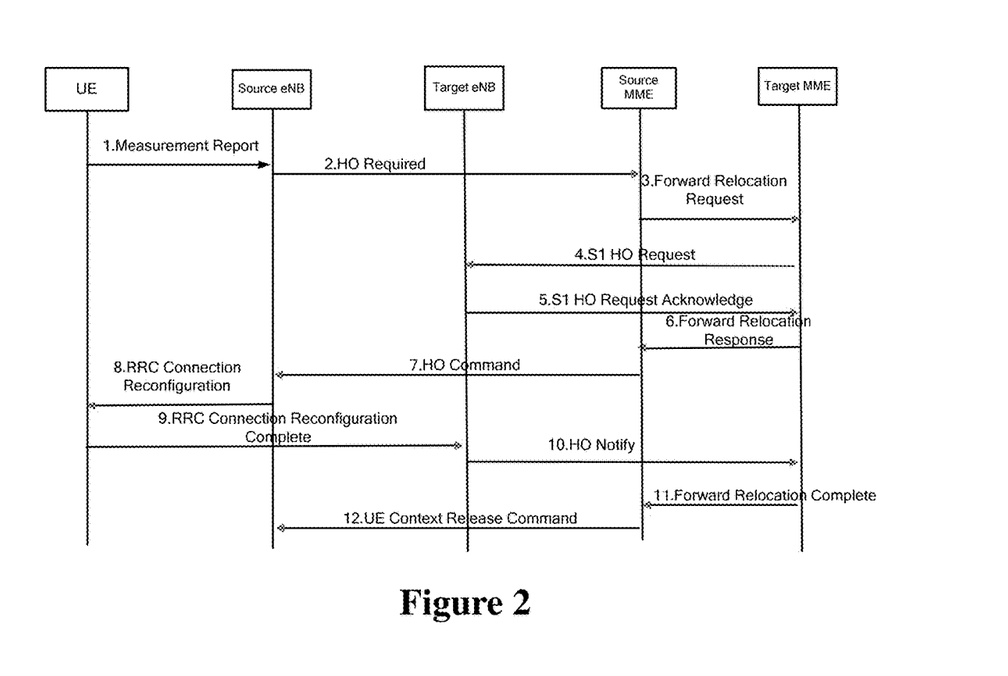
FIG. 2 is a diagram of S1 handover process in the prior art.

FIG. 2 shows the diagram of S1 handover process. At present, S1 handover process comprises handover preparation, handover execution and handover notification phases. Wherein, handover preparation phase (Step 2-9 in FIG. 2) is initiated by an eNB (Evolved Node B) which decides the target eNB; a source MME (Mobility Management Entity) shall calculate a new NH (Next Hop) and a NCC (Next hop Chaining Counter) after receiving the Handover Required sent by the source eNB and shall send it to the target eNB for use. In addition, the target eNB shall put the NCC in a transparent container to transfer it to the source eNB through the core network in order to synchronize NH key with the UE.

Furthermore, HO Command message carries a HO Command message (i.e. RRC (Radio Resource Control) connection reconfiguration message in the radio) generated by the target eNB, and the message transferred to the UE by the source eNB; the UE synchronizes the NH with the target eNB based on NCC after receiving the HO Command message and further generates the key used for the radio interface.

Figure 3:
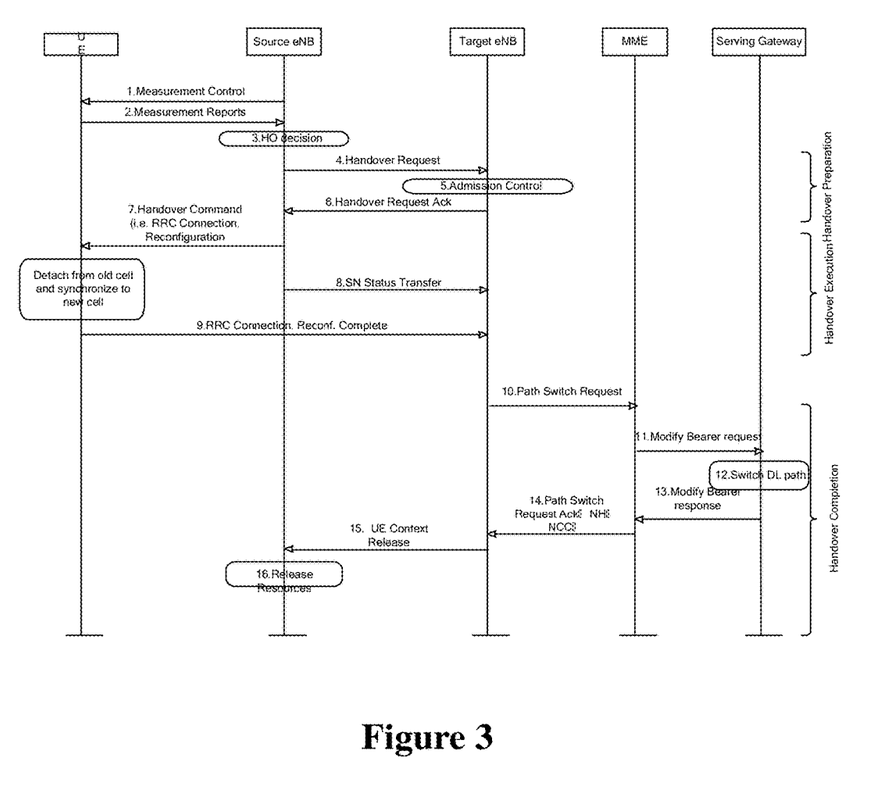
FIG. 3 is a diagram of X2 handover process in the prior art.

FIG. 3 shows the diagram of X2 handover process. Presently, X2 handover process comprises handover preparation, handover execution and path switch phases. Wherein, during X2 handover, since the serving eNB of the UE is transferred from the source eNB to the target eNB, the uplink and downlink user data transmission path between the eNB and a SGW (Serving Gateway) needs to be transferred to the target eNB. The target eNB initiates path switch process after UE handover and notifies the downlink data transmission address and other information to the SGW through MME. The SGW notifies the uplink data transmission address and other information to the eNB through MME in response message.

Specifically, during path switch, the MME generates a new key NH, distributes an NCC for the key and put the NH and NCC in Path Switch Request Acknowledge message to the target eNB. Only the UE and MME can calculate the NH, and eNB is not able to calculate the NH, so the source eNB does not know the NH value sent to the target eNB from the MME; the target eNB and UE calculate the key for the air interface by the NH, and the source eNB cannot calculate the NH, hence security isolation is realized.

The inventor finds that at least the following problems exist in the prior art in the process realizing the present invention:

DeNB usually covers a larger area in relay scenarios. If UE handover failed, it may select a DeNB cell to access, rather other RN. In case of UE handover from an adjacent eNB to the DeNB, to improve the handover success rate, the DeNB can forward the complete Handover Request message to the RN involved in the RRC reestablishment information when forwarding the Handover Request message to the target RN. The Handover Request message includes the RRC reestablishment information prepared by the source eNB, the key NH the MME sends to the target eNB and the corresponding Counter NCC. It will lead to a situation that the same pair of {NH, NCC} is sent to more than one target nodes (RN, DeNB). Once the attacker attacks one of RNs and gets the NH, it can calculate the key used by the UE in radio interface no matter which RN or DeNB the UE is handed over to, so as to crack the content of UE communication and invade the privacy of users.

SUMMARY OF THE PRESENT INVENTION

The embodiments of the present invention provide a method and device for security isolation to realize the isolation of key.

To realize the purpose abovementioned, the embodiments of the present invention provide a method for security isolation, which comprises:

When a relay device receives a Handover Request message, if the Handover Request message contains reestablishment information for another cell, then when a UE is successfully handed over to a cell of the relay device or is successfully reestablished in the cell of the relay device, the relay device requesting a piece of key information from core network equipment.

The embodiments of the present invention provide a method for security isolation, which comprises:

The DeNB analyzes the reestablishment information in the Handover Request message when receiving the Handover Request message;

If the reestablishment information contains the reestablishment information of the managed by the DeNB, and when the UE is successfully reestablished to the cell of the UE, the DeNB requests key information from core network equipment.

The embodiments of the present invention provide a method for security isolation, which comprises:

When the core network equipment receives the message requesting key information, the core network equipment calculates the key information and sends the key information to a node requests.

The embodiments of the present invention provide a relay device, which comprises:

A receiving module, is used to receive Handover Request message;

A processing module, is used to request the key information from core network equipment when the Handover Request message contains reestablishment information for another cell or when the UE is successfully reestablished in the cell of the UE; and receive the key information from core network equipment.

The embodiments of the present invention provide a eNB equipment, which is comprises:

The receiving module, is used to receive Handover Request message;

An analyzing module, is used to analyze the reestablishment information in the Handover Request message;

The processing module, is used to request the key information from core network equipment when the reestablishment information contains the reestablishment information for the management cell of UE and when the UE is successfully reestablished in the cell of the UE; and receive the key information from core network equipment.

The embodiments of the present invention provide a core network equipment, which comprises:

The receiving module, is used to receive Handover Request message;

A calculation module, is used to calculate the key information according to the message requesting the key information;

A sending module, is used to send the key information to the node requests.

Compared with the prior art, the present invention at least has the following advantages:

The probability of successful reestablishment during UE handover is increased, and the probability of handover failure is reduced, also, as the key is isolated, communication security of the user is ensured.

DETAILED DESCRIPTION OF THE EMBODIMENTS OF THE PRESENT INVENTION

The technical solution of the embodiments of the present invention will be described clearly and completely in combination with the drawings. Apparently, the described embodiments are only a part of the embodiments of the present invention. Other embodiments based on the embodiments of the present invention obtained by technical personnel of the field without contributing creative work shall be protected by the present invention.

Embodiment I

Figure 4:
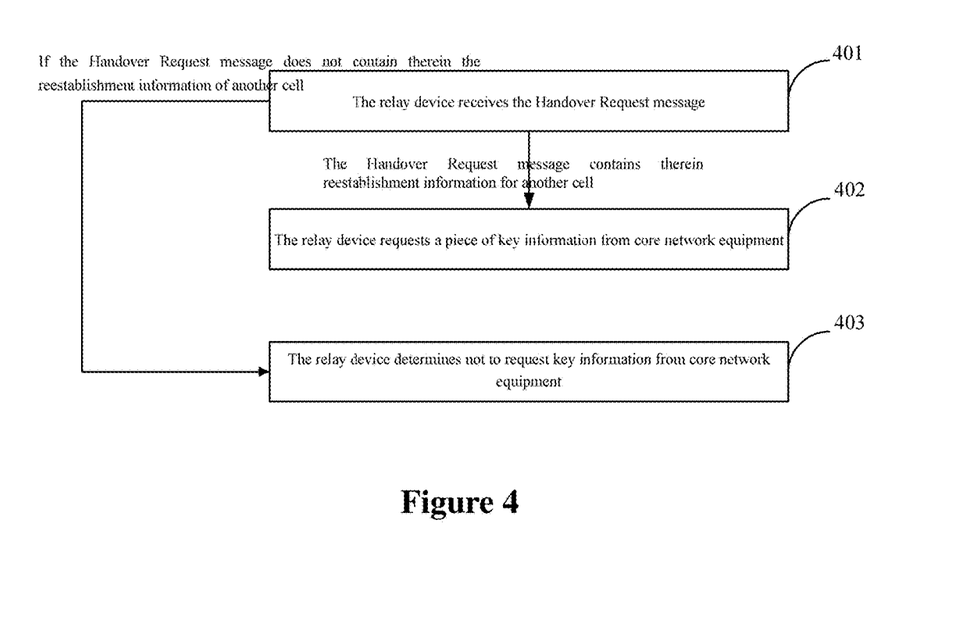
FIG. 4 is a flow diagram of method for security isolation provided in embodiment I of the present invention.

Embodiment I of the present invention provides a method for security isolation. The scenarios the method applied includes, but is not limited to, S1 handover process based on relay scenarios. If Handover Request messages are sent to a plurality of nodes (RN, DeNB), new key message (such as NH message) can be acquired through Path Switch process or new security parameter update process after successful handover or successful reestablishment, so as to realize key isolation and ensure communication security of users, on the basis of improving the successful probability of UE handover. As shown in FIG. 4, the method comprises the following steps: Step 401, the relay device receives Handover Request message. If the Handover Request message contains the reestablishment information (viz. RRC reestablishment information) of other cells, the UE implements Step 402 when successfully handed over to cell of the UE or reestablished in cell of the UE; if the Handover Request message does not contain the reestablishment information of other cells, the UE implements Step 403 when successfully handed over to cell of the UE or reestablished in cell of the UE.

Step 402, the relay device requests the key information (the new key NH information) from core network equipment (such as MME, etc.), and then the relay device can receive the key information from the core network equipment.

In this step, the relay device can request the key information from core network equipment through Path Switch process or through the security parameter update process (viz. the newly defined S1-AP process).

Step 403, the relay device determines not to request key information from core network equipment.

In multiple cells reestablishment preparation process, for S1 handover process, after the source eNB selects the target, to improve the successful probability of UE reestablishment in another cell, the source eNB shall prepare the target cell information and the reestablishment information of another cell under the target eNB, and put the two informations to Source To Target Transparent Container IE of the Handover Request message. Wherein, the reestablishment preparation information comprises the key associated with the cell and integrity check code; the UE will report the corresponding integrity check code when selecting a cell for RRC reestablishment; the target eNB compares the integrity check code reported by the UE with the check code stored by the target eNB, and the UE is allowed to enter the cell if the two check codes are consistent.

In embodiments of the present invention, when the UE hands over from the relay device to another equipment (for example, the UE hands over from the RN to the neighbor eNB), to improve the handover success rate, when the relay device prepares reestablishment cell, the relay device can prepare the cell reestablishment information with the same eNB identification (eNB ID), including cell reestablishment information of DeNB and cell reestablishment information of other RN cells under DeNB. Once the UE is failed to hand over, it will select DeNB cell for reestablishment and may reestablish successfully.

In addition, in embodiments of the present invention, after the relay device receives the Handover Request message, if the target cell is not the cell managed by the relay device, but the RRC reestablishment information contains the information of the cell managed by itself, it will not be considered as abnormal; and also if the RRC reestablishment information contains the information other than the cell managed by the relay device, it will not be also considered as abnormal.

It is noted that the processing process abovementioned is aimed to the relay device. The processing for DeNB side also comprises: the DeNB analyzes the reestablishment information in the Handover Request message after receiving the Handover Request message, the DeNB stores the reestablishment information of the management cell of the DeNB contained if the reestablishment information contains the reestablishment information of the management cell of the DeNB; and the DeNB requests the key information (request new key information from the core network equipment through Path Switch process or security parameter update process) from the core network equipment when the UE is successfully reestablished in the cell of the UE. Then the DeNB can receive the key information from the core network equipment.

In embodiments of the present invention, the Handover Request message is the Handover Request message coming from the relay device or core network equipment. After receiving the Handover Request message from the target MME, the DeNB at least analyzes the reestablishment information in the Handover Request message, if the reestablishment information contains the information of the management cell of the DeNB, save at least the reestablishment information of the management cell of the DeNB. If the reestablishment information contains the reestablishment information of other relay devices managed by the DeNB, the DeNB sends the Handover Request message to the relay device involved in the reestablishment information; before sending it, the DeNB can delete the reestablishment information of the management cell of the DeNB carried in the Handover Request message. Furthermore, after forwarding the Handover Request message to other RNs and when the UE is successfully reestablished in cell of the UE, the DeNB requests the new key information from the MME.

After receiving the Handover Request message from the relay device, the DeNB at least analyzes the reestablishment information in the Handover Request message. If the reestablishment information contains the information of the management cell of the DeNB, save at least the reestablishment information of the management cell of the DeNB; when the UE is successfully reestablished in cell of the UE, the DeNB requests the new key information from the MME.

The processing process aiming to MME side of the core network equipment also comprises: when the MME receives the message requesting the key information (receive during Path Switch or security parameter update), the MME calculates the key information (NH, NCC, etc.) and sends the key information to the node requests (relay device or DeNB).

Specifically, after receiving the path switch request (aiming to Path Switch process) or key acquisition request (aiming to security parameter update process), the MME calculates the new NH and NCC and sends them to the node requests. In addition, if the service eNB/cell of the UE does not change, the MME determines not to notify the SGW the updated bearer information, viz. the MME does not send Modify Bearer Request to the SOW.

Embodiment II

Figure 5:
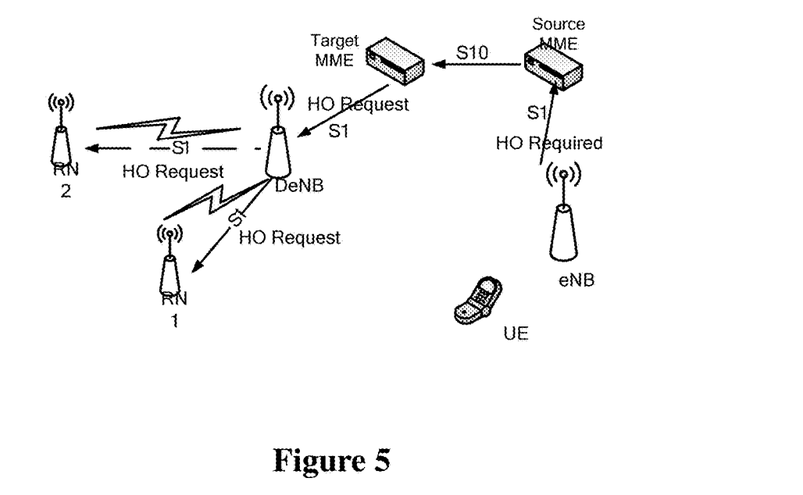
FIG. 5 is a diagram of application scenarios provided in embodiment II of the present invention.

Embodiment II of the present invention provides a method for security isolation. FIG. 5 shows the diagram of application scenarios handing over from the eNB to the RN through S1. The method comprises the following steps:

(1) The source eNB sends the Handover Request message to the source MME. Wherein, the source eNB may prepare information of cells of some RNs under the DeNB when preparing reestablishment information since it is impossible to distinguish the RN cell from the DeNB cell.

(2) The source MME finds out the target MME and sends a Forward Relocation Request; the target MME determines the target DeNB and sends the Handover Request message of the target DeNB.

(3) After receiving the Handover Request message from the target MME, the DeNB sends the Handover Request message to the target RN according to the target cell ID thereof (such as RN1 in FIG. 5).

In embodiments of the present invention, the DeNB at least analyzes the reestablishment information in the Handover Request message. If the reestablishment information contains the information of the management cell of the DeNB, save at least the reestablishment information of the management cell of the DeNB (for example, save the Handover Request message completely). If the Handover Request message contains the reestablishment information of other RNs, the DeNB can forward the Handover Request message to the RN involved (such as RN2 in FIG. 5). It is optional, the DeNB can also delete the reestablishment information of the management cell of the DeNB carried in the Handover Request message when forwarding the Handover Request message to the RN.

In embodiments of the present invention, after the UE is successfully reestablished in the cell of the UE after failed handover, the DeNB can launch the Path Switch process, or a newly defined S1-AP process (security parameter update process) to acquire new key NH.

Figure 6:
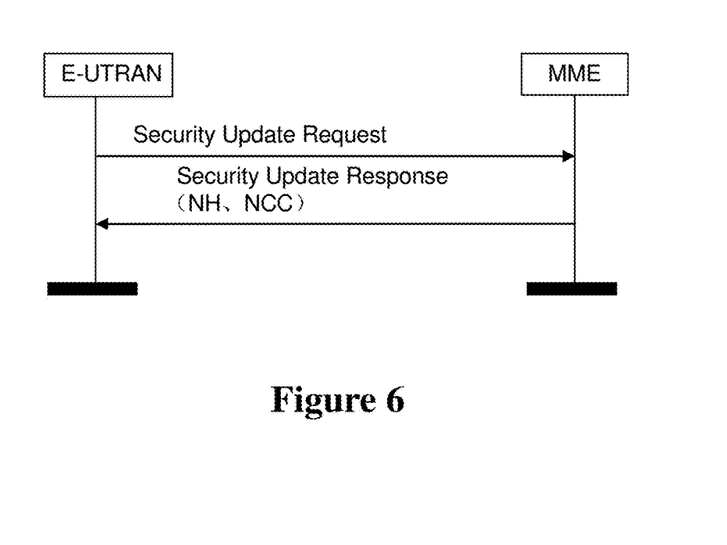
FIG. 6 is a diagram of a possible security parameter update process provided in embodiment II of the present invention.

(4) It will not be considered as abnormal if the Handover Request message received by the RN1 contains the reestablishment information (the RN1 can infer that the DeNB may send the same Handover Request message to other RNs) other than the cell of the DeNB, and the DeNB launches the path switch process or a newly defined S1-AP process when the UE is successfully handed over to the cell of the UE or is successfully reestablished in the cell of the UE after failed handover to acquire new key NH. If the Handover Request message received by the RN1 does not contain therein the reestablishment information other than the cell of the DeNB, the RN1 can not acquire new key NH from the MME; furthermore, the RN1 can generate a new $K_{eNB}^*$ with the UE by using the newly acquired NH and NCC to realize key isolation. In embodiments of the present invention, a possible security parameter update process is shown in FIG. 6.

The newly defined S1-Ap process abovementioned is used for the eNB (including eNB, RN, DeNB, HeNB and other types of nodes) to acquire the new NH and NCC from the MME. The advantages for the process is that it is only used between the eNB and the MME and does not involve the information interaction among MME, SGW and PGW, which can save processing load of the core network.

As a possible implementing mode, the DeNB only sends the Handover Request message to the target RN1 in Step (3) and does not send it to other RNs involved; at that time, if the UE is successfully handed over to or reestablished in cell of the RN1, the RN1 is unnecessary to acquire the new key from the MME.

(5) After the RN2 receives the Handover Request message, it will not be considered as abnormal if the target cell is not the management cell of the RN2, but the reestablishment information contains the information of the management cell of the RN2. If the Handover Request message received by the RN2 contains the reestablishment information other than the cell of the DeNB, the RN2 launches the Path Switch process or the security parameter update process after the UE is successfully reestablished in the cell of the UE to acquire new key NH.

(6) If there is equipment in DeNB/RN1/RN2 launched the process to acquire new key from the MME, the MME checks whether the current cell or current eNB of the UE changes after receiving path switch request. If the current cell or current eNB does not change, the MME will not send Modify Bearer Request to the SGW and return path switch request confirmation message to the source node of the message. The MME calculates the new NH and NCC after receiving the security parameter update request message and return the NH and NCC to the source node of the message.

(7) The DeNB/RN1/RN2 generates new $K_{eNB}^*$ with the UE by using the newly acquired NH and NCC to realize key isolation.

Embodiment III

Figure 7:
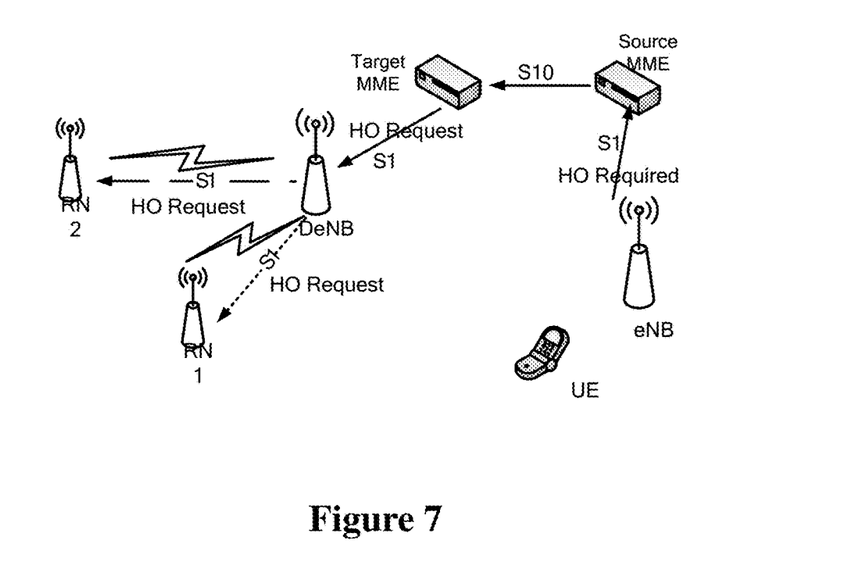
FIG. 7 is a diagram of application scenarios provided in embodiment III of the present invention.

Embodiment III of the present invention provides a method for security isolation. FIG. 7 shows the diagram of application scenarios handing over from the eNB to the DeNB through S1. The method comprises the following steps:

(1) The source eNB sends the Handover Request message to the MME.

(2) The source MME finds out the target MME and sends the Forward Relocation Request; the target MME determines the target DeNB and sends the Handover Request message of the target DeNB.

(3) After receiving the Handover Request message from the target MME, and if Handover Request message contains the reestablishment information of other RN cells, the DeNB can forward the Handover Request message to the RN involved (as RN1 and RN2 in FIG. 7). It is optional, the DeNB can delete the reestablishment information of the management cell of the DeNB carried in the Handover Request message when forwarding the Handover Request message to the RN.

(4) It will not be considered as abnormal if the target cell is not the management cell of the RN after receiving the Handover Request message, but the RRC reestablishment information contains the information of the management cell of the RN.

(5) If the DeNB forwards the Handover Request message to other RNs in Step (3), the DeNB launches the Path Switch process or the security parameter update process after the UE is successfully reestablished in the cell of the UE to acquire new key NH.

(6) The MME checks whether the current cell or current eNB of the UE changes after receiving path switch request. If the current cell or current eNB does not change, the MME will not send Modify Bearer Request to the SGW and return path switch request confirmation message to the source node of the message. The MME calculates the new NH and NCC after receiving the security parameter update request message and return the NH and NCC to the source node of the message.

(7) The DeNB generates new $K_{eNB}^*$ with the UE by using the newly acquired NH and NCC to realize key isolation.

(8) If the Handover Request message received by the RN contains the reestablishment information other than the cell of the DeNB, the RN launches the Path Switch process or the security parameter update process after the UE is successfully reestablished in the cell of the UE to acquire new key NH. (The RN can infer that the DeNB may send the same Handover Request message to other RNs).

(9) The MME checks whether the current cell or current eNB of the UE changes after receiving path switch request. If the current cell or current eNB does not change, the MME will not send Modify Bearer Request to the SGW and return path switch request confirmation message to the source node of the message. The MME calculates the new NH and NCC after receiving the security parameter update request message and return the NH and NCC to the source node of the message.

(10) RN generates the new $K_{eNB}^*$ with the UE by using the newly acquired NH and NCC to realize key isolation.

Embodiment IV

Figure 8:
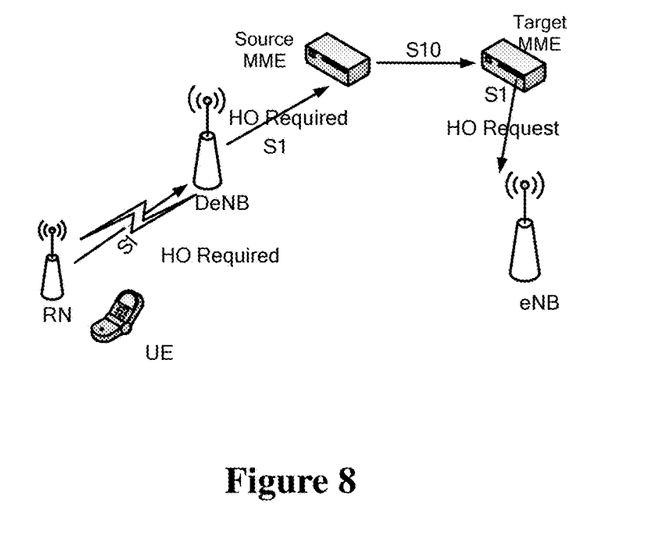
FIG. 8 is a diagram of application scenarios provided in embodiment IV of the present invention.

Embodiment IV of the present invention provides a method for security isolation. FIG. 8 shows the diagram of application scenarios handing over from the RN to the eNB through S1. The method comprises the following steps:

(1) The source RN prepares information of the target eNB cell and information of the cell sharing the same eNB ID when preparing to reestablish information. Wherein, which reestablish information of the cell sharing the same eNB ID is to be prepared by the source RN can be determined in accordance with the measurement results reported by the UE.

(2) The DeNB sends the Handover Request message to the target MME after receiving the Handover Request message from the RN.

In embodiments of the present invention, the DeNB at least analyzes the reestablishment information therein (such as Source to Target Transparent Container IE) after receiving the Handover Request message from the RN. If the reestablishment information contains the information of the management cell of the DeNB, save at least the reestablishment information of the management cell of the DeNB. It is optional, the DeNB can delete the RRC reestablishment information of the cell sharing the same eNB ID in the Handover Request message when forwarding the Handover Request message to the MME.

(3) The source MME finds out the target MME and sends the Forward Relocation Request; the target MME determines the target eNB and sends the Handover Request message of the target eNB; the target eNB returns the Handover Request message to the target MME; the target MME returns the Forward Relocation Request to the source MME, the source MME sends the Handover Request message to the DeNB and the DeNB forwards the Handover Request message to the RN.

(4) The RN sends the HO Command to the UE, and the UE switches to the target eNB; if the UE is failed to switch, but is successfully reestablished in the DeNB, the DeNB sends the path switch process to the core network, or implements security parameter update process. Then the DeNB generates the new $K_{eNB}^*$ with the UE by using the newly acquired NH and NCC to realize key isolation.

(5) The MME checks whether the current cell or current eNB of the UE changes after receiving path switch request. If the current cell or current eNB does not change, the MME will not send Modify Bearer Request to the SGW and return path switch request confirmation message to the source node of the message. The MME calculates the new NH and NCC after receiving the security parameter update request message and return the NH and NCC to the source node of the message.

(6) The DeNB generates the new $K_{eNB}^*$ with the UE by using the newly acquired NH and NCC to realize key isolation.

Embodiment V

Figure 9:
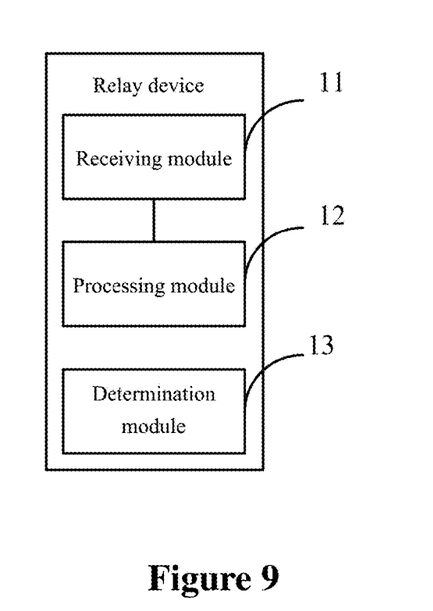
FIG. 9 is a structural diagram of relay device provided in embodiment V of the present invention.

Based on the same inventive concept with the method above, embodiments of the present invention also provide a relay device, as shown in FIG. 9, which comprises:

A receiving module 11, is used to receive Handover Request message;

A processing module 12, is used to request the key information from core network equipment when the Handover Request message contains reestablishment information for another cell or when the UE is successfully reestablished in the cell of the UE, and receive the key information from core network equipment.

The processing module 12 is also used to determine not to request key information from the core network equipment when the Handover Request message does not contain therein the reestablishment information of another cell and when the UE is successfully handed over to cell of the UE or reestablished in cell of the UE.

The processing module 12 is specifically used to request key information from the core network equipment through Path Switch process or security parameter update process.

In embodiments of the present invention, when the UE is handed over from the relay device to other equipments, it also comprises: a determination module 13, which is used to determine the cell reestablishment information of the target eNB as well as the cell reestablishment information sharing the same eNB ID.

Wherein, all modules of device in embodiments of the present invention can be assembled as a whole, or deployed separately. The modules can be combined as a module, or further dismantled into a plurality of submodules.

Embodiment VI

Figure 10:
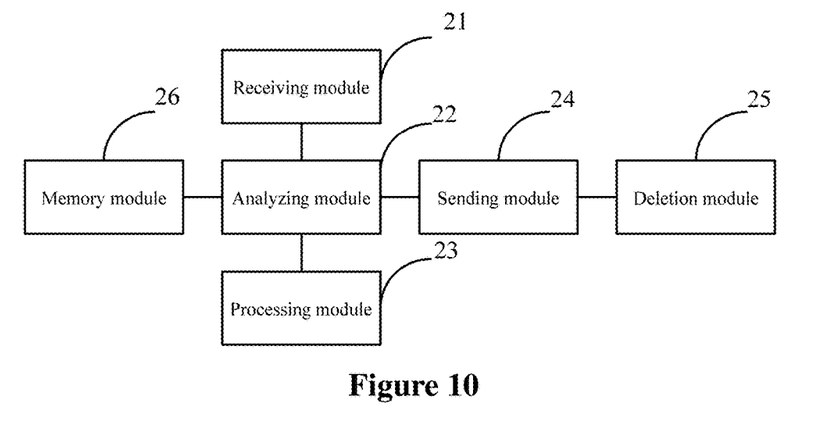
FIG. 10 is a structural diagram of eNB equipment provided in embodiment VI of the present invention.

Based on the same inventive concept with the method above, embodiments of the present invention also provide a eNB equipment, as shown in FIG. 10, which comprises:

A receiving module 21, is used to receive Handover Request message;

An analyzing module 22, is used to analyze the reestablishment information in the Handover Request message;

A processing module 23, is used to request the key information from core network equipment when the reestablishment information contains reestablishment information of the cell managed by itself and the UE is successfully reestablished in the cell of the UE, and receive the key information from core network equipment.

When the Handover Request message comes from the core network equipment, the eNB equipment also comprises: a sending module 24, is used to send the Handover Request message to the relay device involved in the reestablishment information when the reestablishment information contains the reestablishment information of other relay devices managed by the relay device.

The eNB equipment also comprises: a deletion module 25, is used to delete the reestablishment information of the management cell of the DeNB carried in the Handover Request message.

When the Handover Request message comes from the relay device or the core network equipment, the eNB equipment also comprises: a memory module 26, is used to save the reestablishment information of the management cell of the DeNB carried in the Handover Request message.

The processing module 23, is specifically used to request key information from the core network equipment through the Path Switch process or security parameter update process.

Wherein, all modules of device in embodiments of the present invention can be assembled as a whole, or deployed separately. The modules can be combined as a module, or further dismantled into a plurality of submodules.

Embodiment VII

Figure 11:
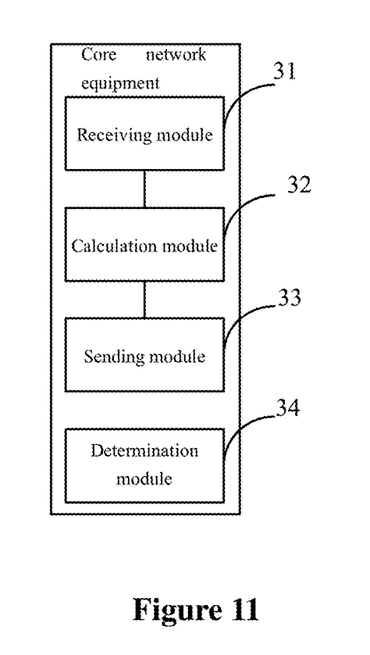
FIG. 11 is a structural diagram of core network equipment provided in embodiment VII of the present invention.

Based on the same inventive concept with the method above, embodiments of the present invention also provide a core network equipment, as shown in FIG. 11, which comprises:

A receiving module 31, is used to receive Handover Request message;

A calculation module 32, is used to calculate the key information according to the message requesting the key information;

A sending module 33, is used to send the key information to the node requests.

The receiving module 32, is specifically used to receive the mess requesting the key information during Path Switch or security parameter update process.

The core network equipment also comprises: a determination module 34, is used to determine not to notify the update bearer information to the SGW when the service eNB or cell of the UE does not change.

Wherein, all modules of device in embodiments of the present invention can be assembled as a whole, or deployed separately. The modules can be combined as a module, or further dismantled into a plurality of submodules.

Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for security isolation, comprising:
   receiving, by a relay device, a Handover Request message, the relay device being wirelessly-connected to core network equipment through a donor cell under a DeNB (Donor Evolved Node B) other than a direct wired link between the relay device and the core network equipment; and
   when the relay device receives the Handover Request message:
   (1) determining, by the relay device, whether the Handover Request message contains reestablishment information for another cell; and
   (2) if the Handover Request message contains the reestablishment information for the other cell, then when a user equipment (UE) is successfully handed over to a cell of the relay device or is successfully reestablished in the cell of the relay device, requesting, by the relay device, a piece of key information from the core network equipment, wherein the piece of key information is a new Next Hop (NH) key or a Next Hop Chaining Counter (NCC).

2. The method according to claim 1, further comprising:
   after the relay device receives the Handover Request message:
   determining, by the relay device, not requesting the key information from the core network equipment, if the Handover Request message does not contain the reestablishment information of the other cell when the UE is successfully reestablished in the cell of the UE, and
   receiving, by the relay device, the key information from the core network equipment.

3. The method according to claim 1, wherein the relay device requests the key information from the core network equipment through a Path Switch process or a security parameter update process.

4. A method for security isolation, comprising:
   receiving, by a processor of a Donor Evolved Node B (DeNB), a Handover Request message, the DeNB being wirelessly-connected to core network equipment;
   analyzing, by the DeNB processor, reestablishment information in the Handover Request message when the DeNB processor receives the Handover Request message; and
   if the reestablishment information contains the reestablishment information of a cell managed by the DeNB: when a user equipment (UE) is successfully handed over to or reestablished to the cell managed by the DeNB, requesting, by the DeNB processor, a piece of key information from the core network equipment, wherein the piece of key information is a new Next Hop (NH) key or a Next Hop Chaining Counter (NCC).

5. The method according to claim 4, further comprising:
   when the Handover Request message is received from the core network equipment, if the reestablishment information contains reestablishment information of other relay devices managed by the DeNB, sending, by the DeNB processor, the Handover Request message to one of the other relay devices involved in the reestablishment information.

6. The method according to claim 5, further comprising: before the DeNB sends the Handover Request message to the one of the other relay devices involved in the reestablishment information, deleting, by the DeNB processor, reestablishment information of a management cell of the DeNB carried in the Handover Request message.

7. The method according to claim 4, further comprising:
   when the Handover Request message is received from a relay device or the core network equipment, after the DeNB analyzes the reestablishment information in the Handover Request message, storing, by the DeNB processor, the reestablishment information of a management cell of the DeNB carried in the Handover Request message.

8. The method according to claim 4, wherein
   the requesting, by the DeNB processor, of the key information from the core network equipment includes requesting the key information from the core network equipment through a Path Switch process or a security parameter update process.

* * * * *